United States Patent
Sullivan et al.

(10) Patent No.: US 10,224,620 B2
(45) Date of Patent: Mar. 5, 2019

(54) ANTENNA HAVING RADIO FREQUENCY LIQUID CRYSTAL (RFLC) MIXTURES WITH HIGH RF TUNING, BROAD THERMAL OPERATING RANGES, AND LOW VISCOSITY

(71) Applicant: Kymeta Corporation, Redmond, WA (US)

(72) Inventors: Philip A. Sullivan, Bozeman, MT (US); W. Brenden Carlson, Shoreline, WA (US); Gregory D. Phelan, Cortland, NY (US); Ryan Stevenson, Woodinville, WA (US); Nathan Kundtz, Kirkland, WA (US); Mohsen Sazegar, Kirkland, WA (US)

(73) Assignee: KYMETA CORPORATION, Redmond, WA (US)

( * ) Notice: Subject to any disclaimer, the term of this patent is extended or adjusted under 35 U.S.C. 154(b) by 52 days.

(21) Appl. No.: 15/600,514

(22) Filed: May 19, 2017

(65) Prior Publication Data
US 2018/0337445 A1    Nov. 22, 2018

(51) Int. Cl.
   *H01Q 1/36*       (2006.01)
   *H01Q 21/06*     (2006.01)
   (Continued)

(52) U.S. Cl.
   CPC .............. *H01Q 1/36* (2013.01); *C09K 19/18* (2013.01); *C09K 19/3001* (2013.01);
   (Continued)

(58) Field of Classification Search
   CPC .. H01Q 1/36; H01Q 3/26; H01Q 7/00; H01Q 21/06
   (Continued)

(56) References Cited

U.S. PATENT DOCUMENTS

| 2014/0021405 A1 | 1/2014 | Manabe et al. |
| 2015/0236412 A1* | 8/2015 | Bily .................. H01Q 3/34 342/374 |

OTHER PUBLICATIONS

PCT Appln. No. PCT/US2017/033707 International Search Report dated Sep. 27 2017, 12 pgs.
(Continued)

*Primary Examiner* — Andrea Lindgren Baltzell
(74) *Attorney, Agent, or Firm* — Womble Bond Dickinson (US) LLP

(57) ABSTRACT

A device containing a radio-frequency (RF) liquid crystal (RFLC) mixture with improved performance is disclosed. In one embodiment, the improved performance includes high RF tuning, broad thermal operating ranges and low viscosity. In one embodiment, the device comprises an antenna comprising: an antenna element array having a plurality of antenna elements and each antenna element having a liquid crystal (LC) structure, wherein the LC structure comprises a mixture of one or more of the following:

(Continued)

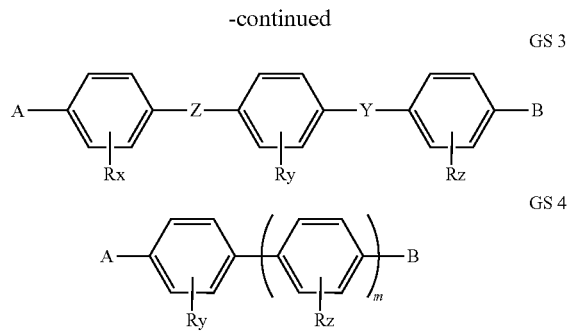

laterally functionalized with one or more of at least a proton, a hydrogen (H), or a heteroatom.

29 Claims, 12 Drawing Sheets

(51) Int. Cl.
H01Q 3/26 (2006.01)
H01Q 7/00 (2006.01)
C09K 19/30 (2006.01)
C09K 19/18 (2006.01)

(52) U.S. Cl.
CPC ............. *H01Q 3/2676* (2013.01); *H01Q 7/00* (2013.01); *H01Q 21/064* (2013.01); *H01Q 21/065* (2013.01); *C09K 2019/181* (2013.01); *C09K 2019/183* (2013.01)

(58) Field of Classification Search
USPC ........................................................ 343/728
See application file for complete search history.

(56) References Cited

OTHER PUBLICATIONS

Coleman, et al., "The Reaction of Potassium Amide in Liquid Ammonia with Chloroethenes," Journal of the American Chemistry Society, 56, 132-134, Retrieved from the Internet, <http://pubs.acs.org/doi/abs/10.1021/ja01316a040> entire document.
PCT/US2017/033707 International Preliminary Report and Written Opinion, dated Nov. 29, 2018, (8 Pages).

* cited by examiner

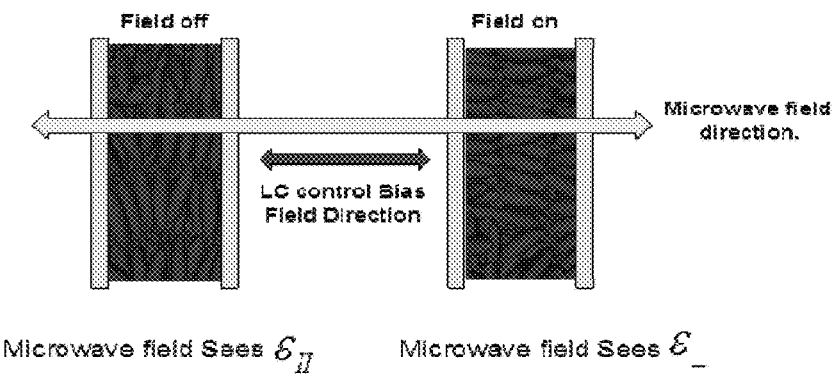
FIG. 1
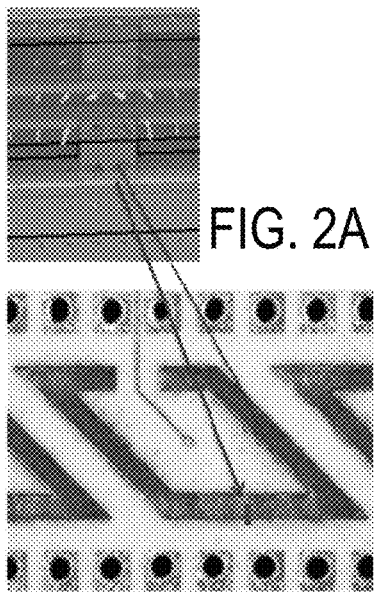
FIG. 2A
FIG. 2B
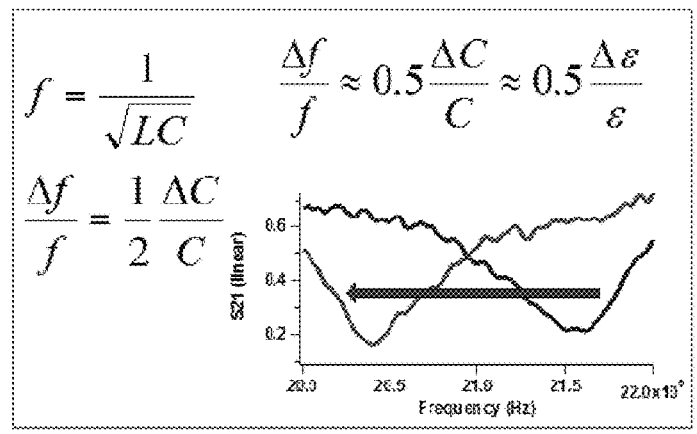
FIG. 2C

ANTENNA HAVING RADIO FREQUENCY LIQUID CRYSTAL (RFLC) MIXTURES WITH HIGH RF TUNING, BROAD THERMAL OPERATING RANGES, AND LOW VISCOSITY

PRIORITY

The present patent application claims priority to and incorporates by reference the corresponding provisional patent application Ser. No. 62/339,550, titled, "Radio frequency liquid crystal (RFLC) mixtures with high RF tuning, broad thermal operating ranges, and low viscosity," filed on May 20, 2016.

FIELD OF THE INVENTION

Embodiments of the present invention relate to the field of radio frequency (RF) devices having liquid crystals (LCs); more particularly, embodiments of the present invention relate to radio frequency (RF) devices having high RF tuning and low viscosity suitable for use in a metamaterial-tuned antenna.

BACKGROUND OF THE INVENTION

Recently, surface scattering antennas and other such radio-frequency devices have been disclosed that use a liquid crystal (LC)-based metamaterial element as part of the device. In the case of antennas, the LCs have been used as part of the antenna elements for tuning the antenna element. The performance of such devices is dependent, at least in part, on the LC that is used. Therefore, it is desirable to develop LCs that have properties that improve the performance of the devices that use them.

SUMMARY OF THE INVENTION

A device containing a radio-frequency (RF) liquid crystal (RFLC) mixture with improved performance is disclosed. In one embodiment, the improved performance includes high RF tuning, broad thermal operating ranges and low viscosity. In one embodiment, the device comprises an antenna comprising: an antenna element array having a plurality of antenna elements and each antenna element having a liquid crystal (LC) structure, wherein the LC structure comprises a mixture of one or more of the following:

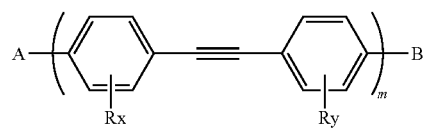
GS 1

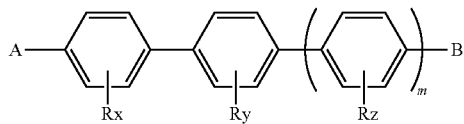
GS 2

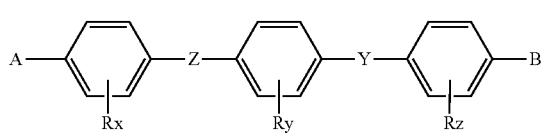
GS 3

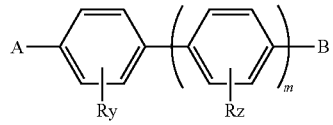
GS 4 laterally functionalized with one or more of at least a proton, a hydrogen (H), or a heteroatom.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates a representation of the relative orientation of the liquid crystal (LC) nematic phase with respect to incident microwave radiation.

FIG. 2A illustrates a computer modeling based representation of the field orientation and concentration inside the metanetworks antenna technology single element.

FIG. 2B is a picture of a representative metanetworks antenna technology single element.

FIG. 2C illustrates a representation of resonance frequency tuning.

DETAILED DESCRIPTION

Figure 3:
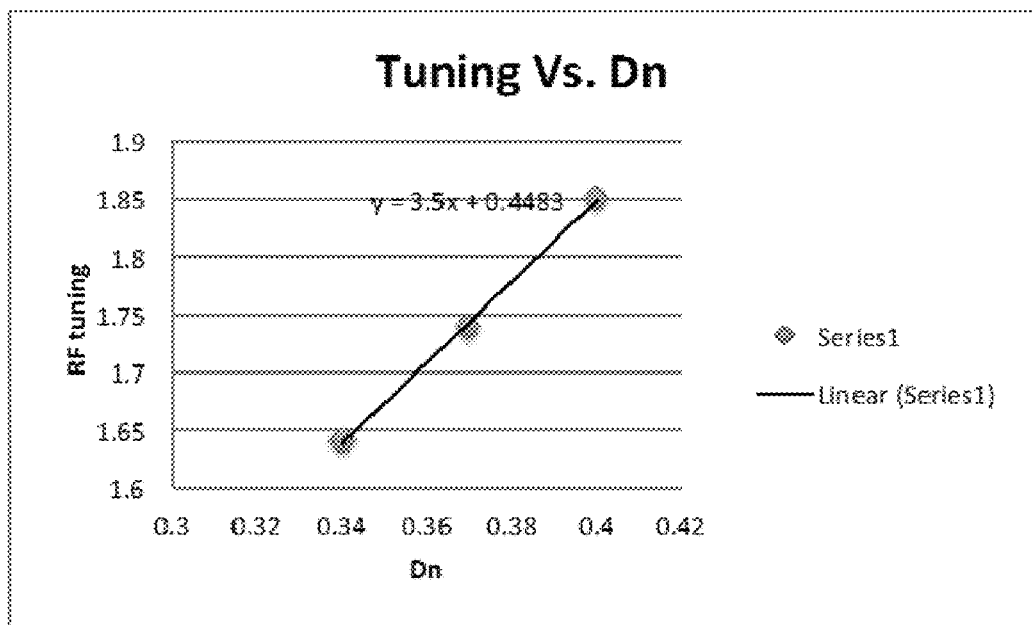
FIG. 3 shows approximate results from radio-frequency (RF) tuning studies combined with Δn estimates made using a simple linear combination model.
Figure 4:
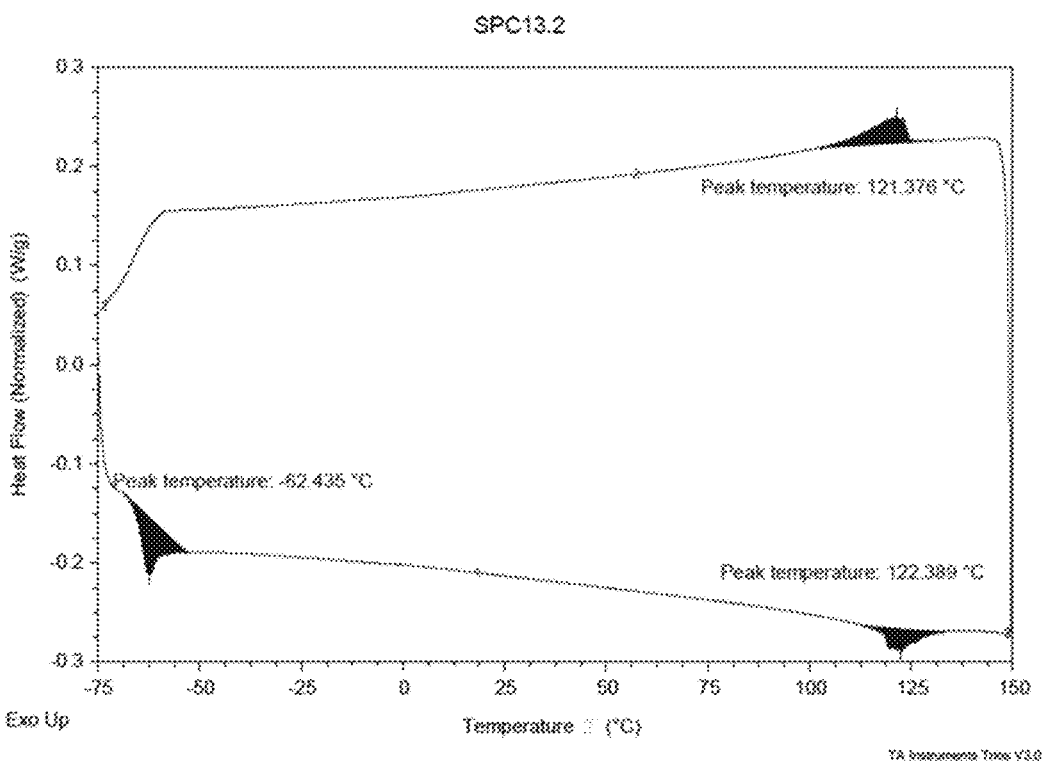
FIGS. 4-8 illustrate thermal (differential scanning calorimetry) traces for selected LC mixtures.
Figure 5:
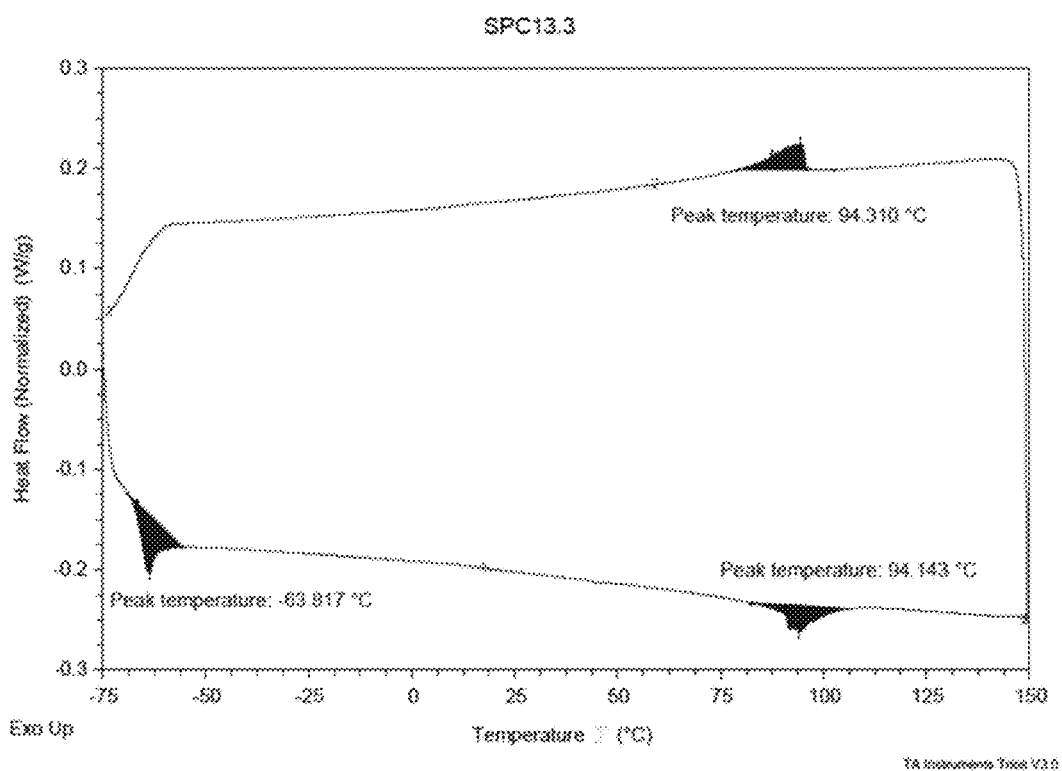
Figure 6:
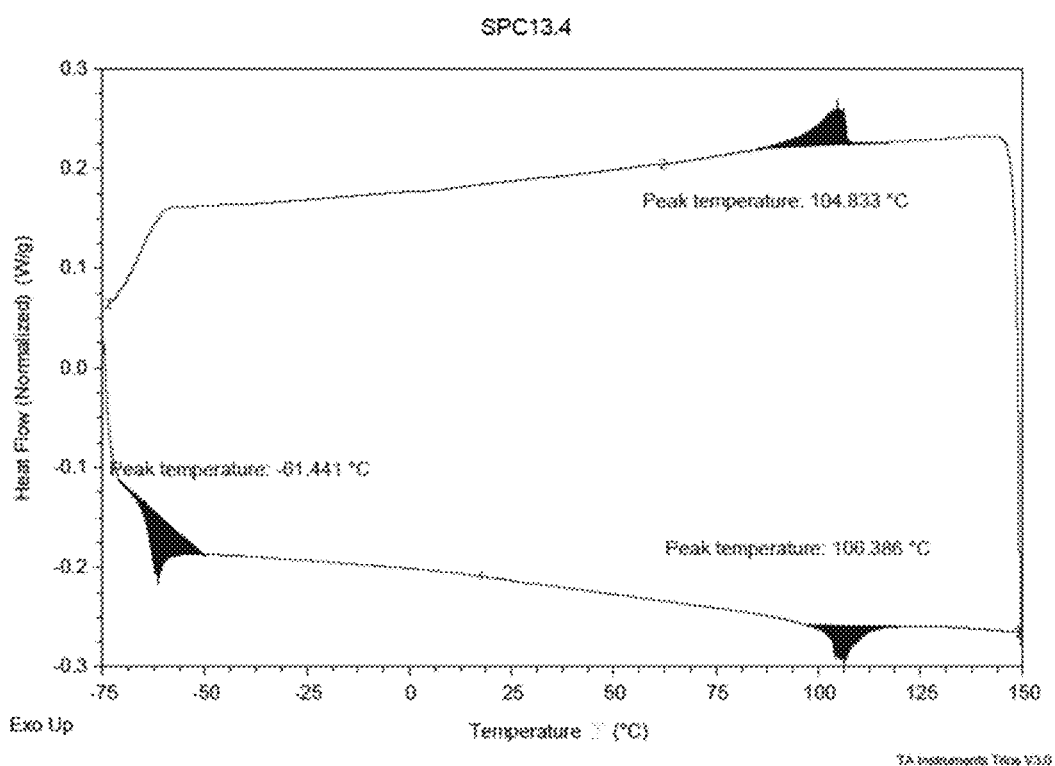
Figure 7:
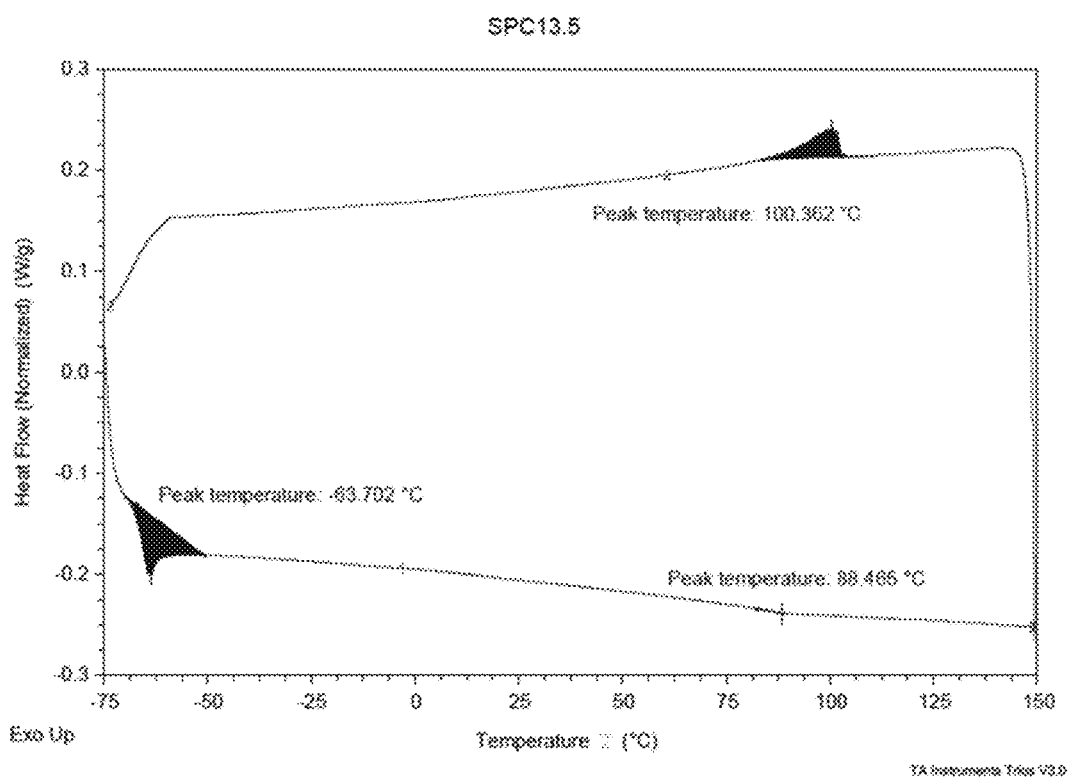
Figure 8:
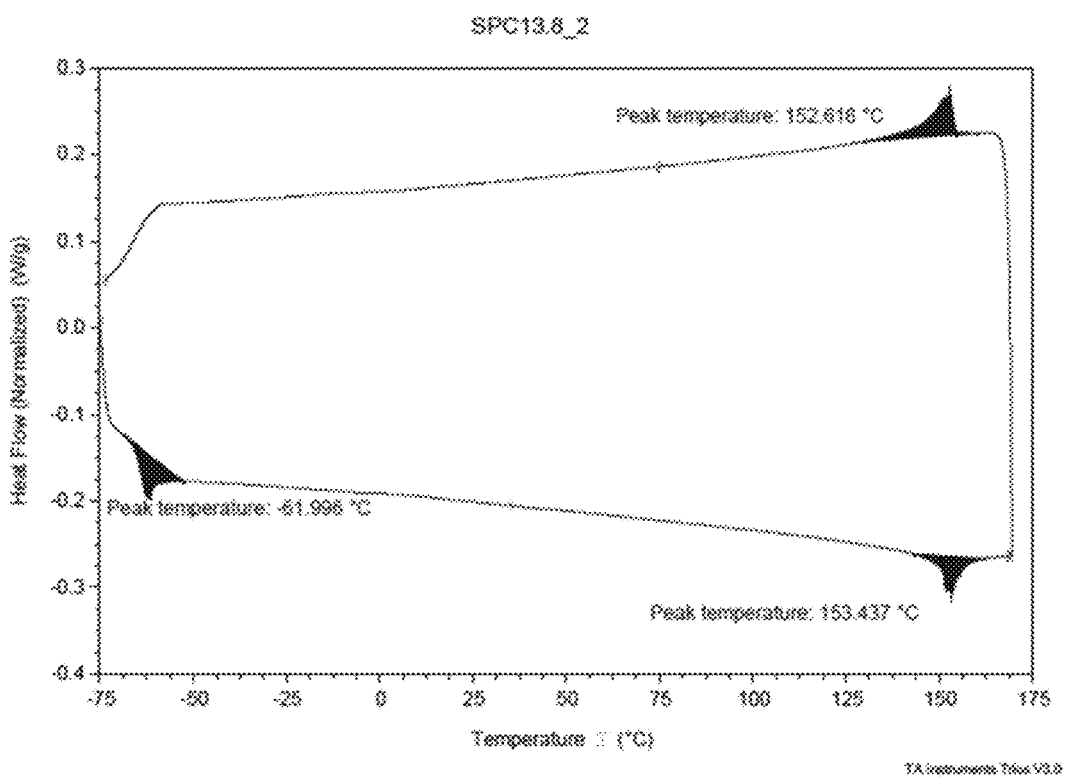

A radio-frequency (RF) device that includes liquid crystal (LC) mixtures and a method for using the same are disclosed. In one embodiment, the RF device may comprise an antenna, phased array or a light modulator. In one embodiment, the LC mixture is a Radio Frequency Liquid Crystal (RFLC) mixture that comprises pi-conjugated mesogenic (liquid crystalline) compounds. In one embodiment, the RFLC is a mixture suitable for use as the active element of the metanetworks antenna technology. To be useful in metanetworks antenna technology, an RFLC mixture displays large voltage-tunable RF dielectric anisotropy (optical $\Delta\eta \geq 0.3$, RF $\Delta\epsilon \geq 1.33$), acceptable temperature stability characteristics, (long-term storage stability at or below $-40°$ C., clearing point$\geq$125 C), low RF loss ($\Delta\epsilon$/Tan $\delta \geq 75$), and acceptable viscoelastic properties ($\gamma 1/\kappa 3 \leq 15$).

For purposes herein, the "tuning range" is defined as the amount of change in the RF dielectric constant, $\Delta\epsilon$(RF), and for optical applications this is defined as $\Delta n$.

In one embodiment, the liquid crystal mixtures disclosed herein are high birefringence liquid crystals. High birefringence is typically recognized in the field as $\Delta n>0.3$. These may be used in a number of applications including, but not limited to: 1) antenna applications, such as resonant element based holographic antennas, reflect-arrays and phased arrays; and 2) spatial light modulators, such as, for example, those used in LIDAR (light imaging detection and ranging). In order for high-birefringence liquid crystals to be useful in the above applications, they must display fast switching times and high tuning ranges.

Embodiments of this invention include a series of liquid crystal mixtures in which large radio frequency (RF) dielectric tuning (high birefringence) is combined with low melting point and low rotational viscosity. In one embodiment, the LC mixtures have melting points as low as $-63$ C and clearing points as high as 135 C combined with rotational viscosities of ~13. These key innovations allow these materials to deliver fast switching speeds and operate at low temperatures. This is difficult to achieve in general because, typically, increased birefringence is accompanied by increased viscosity and high melting point. These materials enable operation of the antenna active elements, and thus enable the construction of the antenna array.

In one embodiment, the liquid crystal used delivers: 1) sufficient dielectric tuning (optical $\Delta\eta \geq 0.3$, RF $\Delta\epsilon \geq 1.33$); 2) acceptable relaxation time (~20 ms, $\gamma 1/\kappa 3 \leq 15$); 3) appropriate thermal properties (long-term storage stability at or below $-40°$ C., clearing point$\geq$125° C.); 4) reasonable RF loss ($\Delta\epsilon$/Tan $\delta \geq 75$). This combination of properties is relatively unique. Any of these characteristics may be singularly optimized. However, it is significantly more difficult to realize a material that satisfies all requirements simultaneously. Therefore, such materials (mixtures) and design strategies are inherently unique and valuable.

Most liquid crystals in use commercially are not single molecular structures. They consist of a mixture of several compounds that each exhibits unique physical and chemical characteristics. Therefore, molecular-level structure/property relationships are employed to design single-molecule structures with appropriate polarity and polarizability anisotropy. These same structure/property relationships are simultaneously employed to create a condensed phase (liquid crystalline mesophase) that satisfies all operational requirements.

Embodiments of this invention not only provide a specific chemical "recipe" for a usable LC mixture, but also provide a series of general concepts that can be further used to create new mixtures with rationally designed properties.

The specific chemical structures provided may be used in multiple mixture "recipes" in order to tune specific chemical and physical characteristics. The general structure/property relationships demonstrated may be used to design new materials with significantly enhanced performance characteristics.

In one embodiment, the high-birefringence liquid crystals disclosed herein, at the molecular level, create large length/width polarizability anisotropy. In one embodiment, this is accomplished by creating a long, rigid, $\pi$-electron conjugated core (e.g., tolane). By itself (unfunctionalized), such a molecule has a very high melting point due to strong intermolecular interactions. In one embodiment, in order to reduce the melting point and favor nematic (liquid crystalline) phase formation, a long carbon tail is attached to one end. To the opposite end, a polar group, such as, for example, a Isothiocyanate (NCS), trifluoromethoxy ($OCF_3$), cyano (CN), bromide (Br), or tifluorophenyl ($C_6H_2F_3$) is used to further increase birefringence and to introduce a permanent dipole.

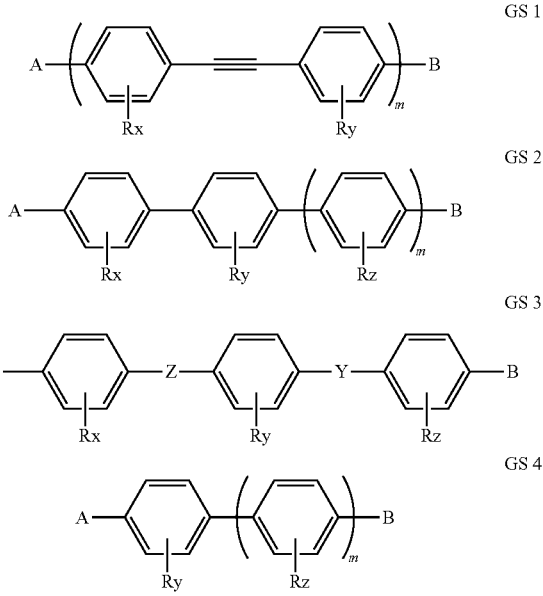

This idea can be expressed via the general structures above (GS 1, GS 2, GS 3, and GS 4). In the case of GS 1, GS 2, and GS 4 the core is expressed in terms of units of number, m. This core may be laterally functionalized, most commonly with protons, H, and/or heteroatoms such as, for example, fluorine (F), bromine (Br), or chlorine (Cl). Other groups, such as alkyl groups such as, for example, methyl (CH3) ethyl (CH2CH3), propyl (CH2CH2CH3), or methoxy (OCH3), ethoxy (OCH2CH3), propoxy (OCH2CH3), or trifluoromethoxy (OCF3), may also be introduced in the various R positions. Such lateral functionalization modifies intermolecular interactions in order to disfavor smectic phase formation and/or to modify rotational viscosity, $\gamma$, elastic constant, $\kappa$, and melting point, $T_m$. Lengthening the core (increasing m) increases birefringence as a general rule. In this case, A is either a saturated carbon chain as seen in structures 1-6 below, or an alkoxy ($OC_nH_{(2n+1)}$), or a similarly functionalized cyclohexyl and/or phenyl moiety. The longer the carbon chain, the lower the melting point in general. In this case, B is either a second alkyl or alkoxy chain or a polar group such as a Isothiocyanate (NCS), trifluoromethoxy ($OCF_3$), cyano (CN), bromide (Br), or tifluorophenyl ($C_6H_2F_3$). Structure GS 3 illustrates a complementary structural motif in which Z and Y represent single or triple bonds independently of one another.

Creating Liquid Crystal Mixtures

The following are example embodiments of six LC chemical structures that may be used as the metamaterial element in an antenna element in an antenna.

Naming of Structures and Common Units

Structures 1-6 all possess subunits in common.

Structure 1 is known as a cyclohexyl-phenyl. It consists of a cyclohexyl ring and a phenyl ring attached together. On the left side, n denotes the number of carbons present in a saturated hydrocarbon tail. The number of carbons com- 1)
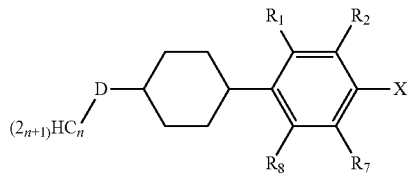

2)
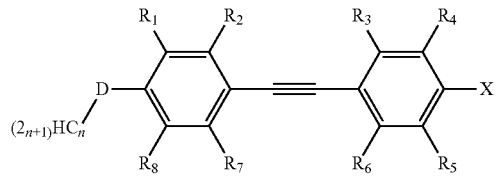

3)
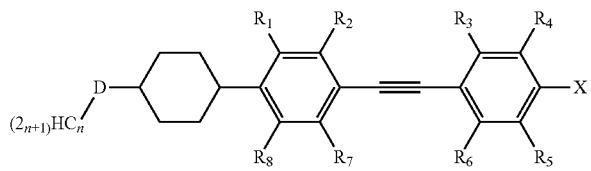

4)
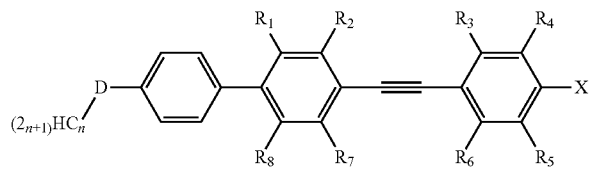

5)
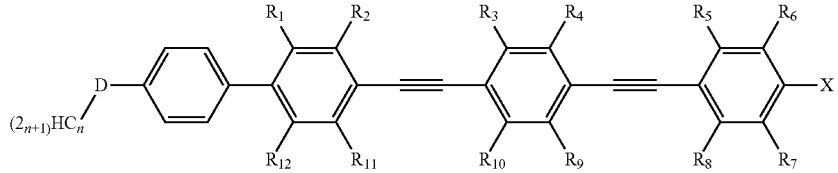

6)
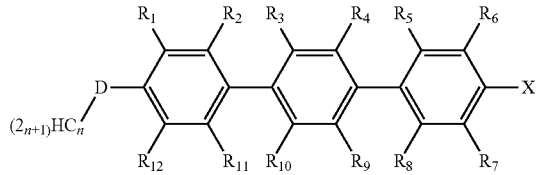

In the six structures of Scheme 1 depicted above, a liquid crystal mixture contains any or all of the above structures where: $D=CH_2$, O, S, Se; $R1-R12=C_nH_{(2n+1)}$, H, F, Cl, $SC_nH_{(2n+1)}$, $SeC_nH_{(2n+1)}$, Br; and $X=NCS$, F, Br, Cl, H.

None of the compounds shown in Scheme 1 as structures 1-6 are liquid at room temperature. In order to be a liquid crystal, the mixture must be a liquid within a useful operating temperature range. To form liquids at room temperature, mixtures of similar compounds such as those shown as general structures GS 1, GS 2, GS 3 and specific structures 1-6, are prepared by weighing specific amounts of each compound, mixing them together and then heating until the compounds melt and mix together. An appropriate mixture will not re-solidify (freeze) at room temperature. A mixture may be as simple as mixing one specific base structure bearing different lengths of carbon chains (n=1-7), or it may be as complicated as adding many different structures at varying weight percent.

Base structures such as those exemplified by 1-6 and/or GS 1/GS 2 not only differ in terms of physical properties, but they may also differ in terms birefringence, $\Delta n$. Therefore, mixtures containing different weight percentages will also have different optical properties. For purposes herein, a base mixture may be tailor made as above to have specific physical and optical properties.

monly varies between n=1 and n=7: n=1 methyl; n=2 ethyl; n=3 propyl; n=4 butyl; n=5 pentyl; n=6 hexyl; n=7 heptyl. In one embodiment, D is a carbon and two hydrogens (an extra carbon has been added), X=NCS, and n=4. In such as case, structure number 1 is named: pentyl-cyclohexylphenyl isocyanate. If the same basic structure is kept and D is changed to an oxygen, then the structure is named: butoxy-cyclohexylphenyl isocyanate.

Structure 2 is referred to herein as a tolane. A tolane is basically two phenyl rings at either end of a triple bond. Using the same naming convention as above, in one embodiment, when D=CH2 and X=NCS, then the structure number 2 is named: pentyl-isothiocyanato tolane.

Structure 3 is a combination of structures 1 and 2. It is referred to herein as cyclohexyl-tolane. In one embodiment, D=CH2 and X=NCS. In this case, structure 3 is named: pentyl-isothiocyanto cyclohexyl-tolane.

Structure 4 is referred to herein as a phenyl-tolane. A phenyl ring is added to the base tolane structure. In one embodiment, D=CH2 and X=NCS. In this case, structure 4 is named: pentyl-isothiocyanto phenyl-tolane.

Structure 5 is referred to herein as a phenyl-bis-tolane. It has two triple-bonds between phenyl groups and another phenyl ring. In one embodiment, D=CH2 and X=NCS. In this case, structure 5 is named: pentyl-isothiocyanto phenyl-bistolane.

Structure 6 is referred to herein as a terphenyl, with three phenyl rings attached together. In one embodiment, D=CH2 and X=NCS. In this case, structure 6 is named: pentyl-isothiocyanto terphenyl.

Scheme 2 below illustrates another set of mixtures for use in antennas disclosed herein. Each of the mixtures includes the use of an NCS terminal group.

LC Single Molecule and Mixture Test Results

TABLE 1

Thermal data gathered corresponding to chosen LC singles from Scheme 2

| Compound | Melt ($T_m$) | Clearing ($T_c$) | Freeze ($T_{Cr}$) | Δn |
|---|---|---|---|---|
| 11.7h | 64.2 | 71.6 | — | 0.28 |
| 11.7i | 53.5 | 64.5 | 34.2 | — |
| 111.7f | 103 | — | — | — |
| 111.7h | 96.9 | — | 51 | — |
| 4TOLCl | 44.4 | — | — | 0.28 |
| 4OTOLCl | 81.9 | — | 61.7 | 0.26 |
| FNCST1 | 49 | — | — | ~0.29 |
| TFNCST1 | 68 | 218 | — | 0.50 |
| 111.7n | 77 | 239 | — | ~0.38 |
| 111.7o | 63 | 243 | — | ~0.38 |

TABLE 2

Mixture percentages and tuning results (tuning is given in GHz as Δf)

| | 12.6 | 13.1 | 13.2 | 13.3 | 13.4 | 13.5 | 13.8 |
|---|---|---|---|---|---|---|---|
| 11.7h | 8.6 | 10.9 | 8.6 | 8.6 | 8.6 | 8.6 | 5.16 |
| 11.7i | 5.8 | 7.3 | 5.8 | 5.8 | 5.8 | 5.8 | 3.48 |
| 111.7h | 2.9 | 3.6 | 2.9 | 2.9 | 2.9 | 2.9 | 1.74 |
| 111.7f | 0 | 1.8 | 0 | 0 | 0 | 0 | 0 |
| 4TOLCl | 17.8 | 21.8 | 17.8 | 17.8 | 0 | 17.8 | 10.68 |
| 4OTOLCl | 0 | 0 | 0 | 0 | 17.8 | 0 | 0 |
| FNCST1 | 13.0 | 14.5 | 0 | 13.0 | 13.0 | 13.0 | 3.6 |
| TFNCST1 | 0 | 40.0 | 13.0 | 23.0 | 23.0 | 25.2 | 40 |
| 111.7n | 23.0 | 0 | 23.0 | 0 | 0 | 9.2 | 15.6 |
| 111.7o | 19.0 | 0 | 19.0 | 19.0 | 19.0 | 7.6 | 13.2 |
| 5CHBT | 10 | 0 | 10 | 10 | 10 | 10 | 6 |
| ΔF (GHz) | 1.66 | 1.74 | 1.64 | 1.58 | 1.63 | 1.7 | 1.8 |
| Tm | −63 | −20 | −62 | −64 | −61 | −64 | −62 |
| Tc | 125 | 94 | 122 | 94 | 106 | 100 | 153 |

As discussed above, useful liquid crystal mixtures are prepared by combining a number of unique base structures (LC singles) at varying percentages by weight. Scheme 2 illustrates a library of LC singles that was synthetically prepared for this work. Table 1 shows the thermal properties of the LC singles shown in scheme 2. The term "Melt" is used to denote the melting point, i.e., the temperature at which compounds change phase from crystalline solid to liquid. The term "Freeze" denotes the freezing point, i.e., the temperature at which freezing re-occurs upon cooling at a linear rate of 10 C/minute. Birefringence, $\Delta n$, is shown where available. Clearing point denotes the temperature at which a nematic phase becomes isotropic (and visibly changes from milky to clear in appearance). From inspection of Table 1, the lowest melting LC single, 4TOLCl, melts at 44.4 C. This is significantly above room temperature (~19 C). Likewise, the highest clearing point is displayed by 111.7o.

As noted earlier, the simplest way to increase $\Delta n$ increasing the amount of the highest $\Delta n$ mixture component (in this case, TFNCST1). However, this solution does not maintain good thermal performance unless the entire mixture is reformulated. For example, 13.1 displays the largest $\Delta n$ of the mixtures given in Table 2, but it also displays the narrowest nematic temperature range. To combat this, several new mixtures were examined. The most successful mixture to date was 13.8. This mix has an estimated $\Delta n$ of ~0.39-~0.4. 13.8 displays an extremely broad nematic temperature range, with a particularly high clearing point. This is accompanied by a somewhat increased viscosity; however, the increase is not dramatic. To combat this, the amount of 5CHBT may be increased without much reduction in $\Delta n$. Bulk testing at −20° C. shows that 13.8 appears to remain quite stable at this temperature.

Microwave Loss and Tuning Measurements

TABLE 3

Dielectric constants perpendicular, $\epsilon'$perp, and parallel, $\epsilon'$para, $\Delta\epsilon$ (13 GHz), and loss tangent for selected LC mixtures measured at 13.17 GHz

| LC Mix | RFLC DATA 13.17 GHz | | | | | | |
|---|---|---|---|---|---|---|---|
| | $\epsilon'$perp | $\epsilon'$para | Tan$\delta$perp | Tan$\delta$para | $\Delta\epsilon$ (13 GHz) | Tan$\delta$Iso | $\Delta\epsilon$/Tan$\delta$Iso |
| SPC 5 | 2.323 | 3.32 | 0.0148 | 0.0031 | 0.997 | 0.0109 | 91.47 |
| SPC 7 | 2.323 | 3.54 | 0.0226 | 0.0054 | 1.217 | 0.0169 | 72.15 |
| SPC 13.6 | 2.323 | 3.539 | 0.0286 | 0.0086 | 1.216 | 0.0219 | 55.44 |
| SPC 13.8 | 2.323 | 3.87 | 0.0293 | 0.0087 | 1.547 | 0.0224 | 68.96 |

Table 2 shows various mixtures made using this library of compounds. Weight-percentages of each compound used are given, and resulting thermal and tuning properties are given.

It can be further illustrated by inspection of Table 2 that mixtures may be made using the LC single library shown in Scheme 2 that freeze as low as −64° C. and clear as high as 153° C. These values are comparable to the widest nematic temperature ranges ever reported.

FIGS. 1 and 2A-C illustrate the concept of tuning as it relates to the metanetworks antenna technology. This concept is best illustrated in terms of a single element, one of many that make up the metanetworks element array-based antenna according to one embodiment. A nematic phase liquid crystal mixture, such as those discussed herein, is embedded within a metanetworks antenna technology single element. FIG. 1 illustrates a representation of the relative orientation of the LC nematic phase with respect to incident microwave radiation. When an electric field is applied, the LC changes its orientation and thus via its $\Delta n$, creates a $\Delta f$ corresponding to the equation given in FIG. 1. This $\Delta f$ determines the operation of the antenna technology.

FIG. 2A illustrates a computer modeling based representation of the field orientation and concentration inside the metanetworks antenna technology single element. FIG. 2B is a picture of a representative metanetworks antenna technology single element. FIG. 2C illustrates a representation of the resonance frequency tuning referred to as $\Delta f$ in Tables 2 and 3.

FIG. 3 shows approximate results from RF tuning studies combined with $\Delta n$ estimates made using a simple linear combination model. Using the linear combination analysis to plot 13.1 and 13.2, $\Delta n$ for 13.1 and 13.2 can be estimated as 0.37 and 0.34 respectively. Plotting this against their average tuning results, it is apparent that in order to tune at ~1.85 GHz, a $\Delta n$ of ~0.4 must be reached.

Note that as $\Delta\epsilon$ ($\Delta n$) increases, so does RF loss in the case of the mixtures shown here. However, in the case of 13.8 this loss remains acceptable for metanetworks antenna technology.

FIGS. 4-8 illustrate thermal (differential scanning calorimetry) traces for selected LC mixtures. These values correspond to those given in Table 2.

The LC described above can be included in antenna embodiments having the following features.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Overview of an Example of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Examples of Wave Guiding Structures

Figure 9:
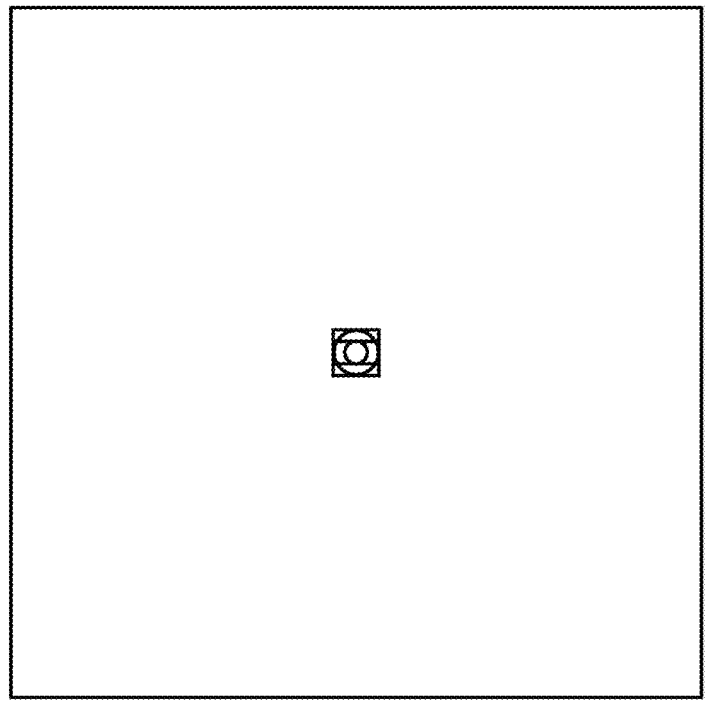
FIG. 9 illustrates a top view of one embodiment of a coaxial feed that is used to provide a cylindrical wave feed.

FIG. 9 illustrates a top view of one embodiment of a coaxial feed that is used to provide a cylindrical wave feed. Referring to FIG. 9, the coaxial feed includes a center conductor and an outer conductor. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

Figure 10:
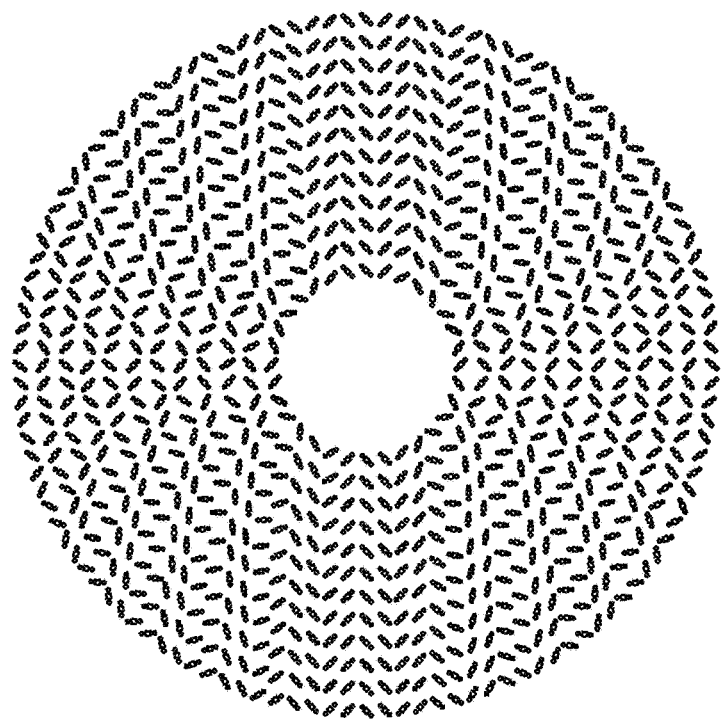
FIG. 10 illustrates an aperture having one or more arrays of antenna elements placed in concentric rings around an input feed of the cylindrically fed antenna.

FIG. 10 illustrates an aperture having one or more arrays of antenna elements placed in concentric rings around an input feed of the cylindrically fed antenna.

Antenna Elements

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty five degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 11:
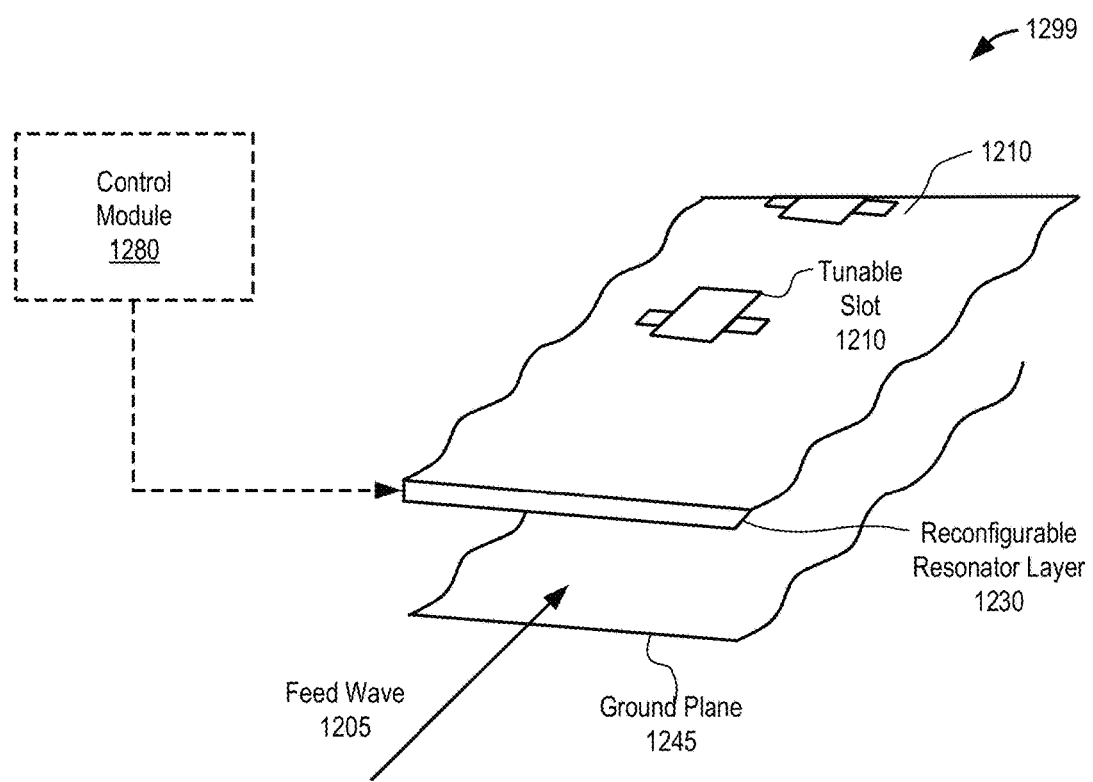
FIG. 11 illustrates a perspective view of one row of antenna elements that includes a ground plane and a reconfigurable resonator layer.

FIG. 11 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Control module 1280 is coupled to reconfigurable resonator layer 1230 to modulate the array of tunable slots 1210 by varying the voltage across the liquid crystal in FIG. 11. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram} = w^*_{in} w_{out}$, with $w_{in}$ as the wave equation in the waveguide and $w_{out}$ the wave equation on the outgoing wave.

Figure 12:
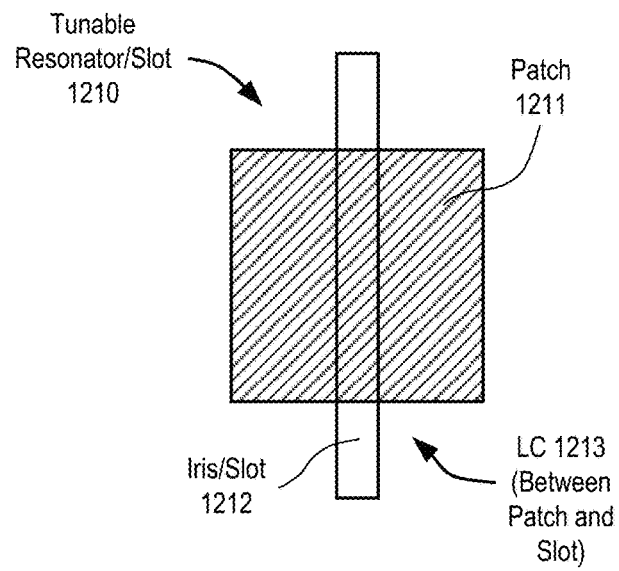
FIG. 12 illustrates one embodiment of a tunable resonator/slot.

FIG. 12 illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 13:
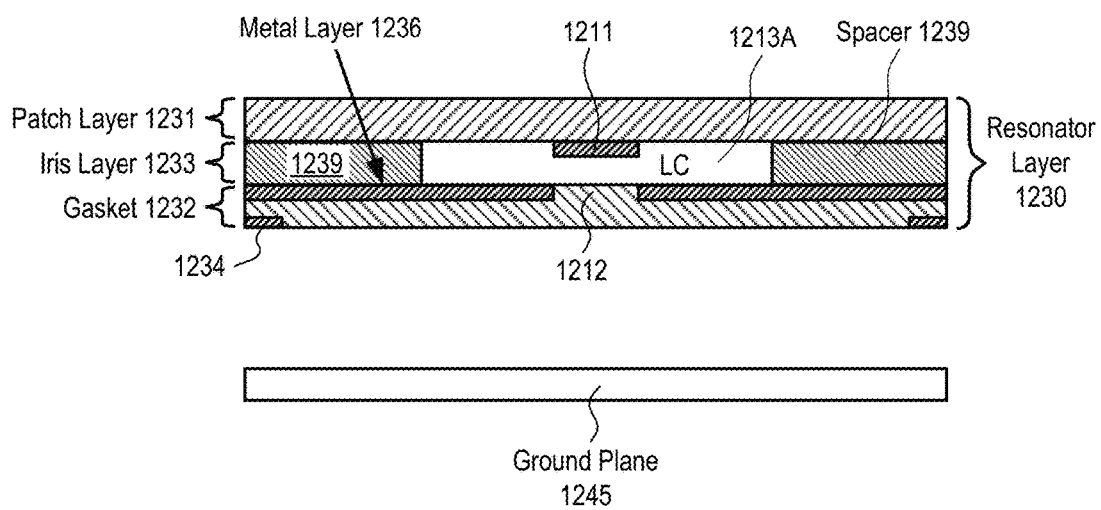
FIG. 13 illustrates a cross section view of one embodiment of a physical antenna aperture.

FIG. 13 illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 13 includes a plurality of tunable resonator/slots 1210 of FIG. 12. Iris/slot 1212 is defined by openings in metal layer 1236. A feed wave, such as feed wave 1205 of FIG. 11, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed below patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 13. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 13 includes multiple tunable resonator/slots, such as tunable resonator/slot 1210 includes patch 1211, liquid crystal 1213, and iris 1212 of FIG. 12. The chamber for liquid crystal 1213 is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by $\lambda/5$. Other spacings may be used. In one embodiment, each tunable slot in a row is spaced from the closest tunable slot in an adjacent row by $\lambda/2$, and, thus, commonly oriented tunable slots in different rows are spaced by $\lambda/4$, though other spacings are possible (e.g., $\lambda/5$, $\lambda/6.3$). In another embodiment, each tunable slot in a row is spaced from the closest tunable slot in an adjacent row by $\lambda/3$.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 14A-D illustrate one embodiment of the different layers for creating the slotted array. The antenna array includes antenna elements that are positioned in rings, such as the example rings shown in FIG. 10. Note that in this example the antenna array has two different types of antenna elements that are used for two different types of frequency bands.

Figures 14A, 14B:
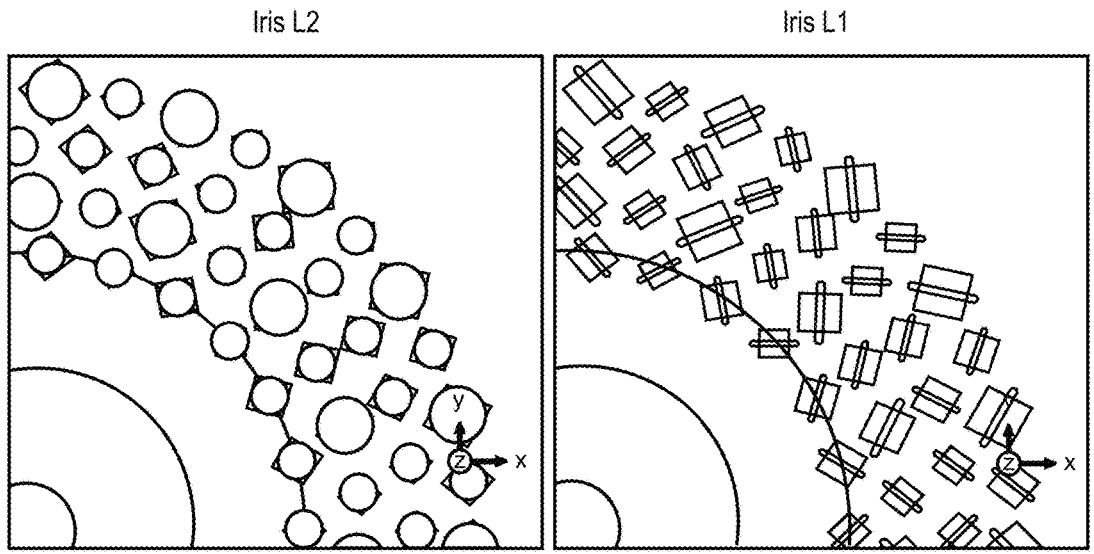
FIGS. 14A-D illustrate one embodiment of the different layers for creating the slotted array.
Figures 14C, 14D:
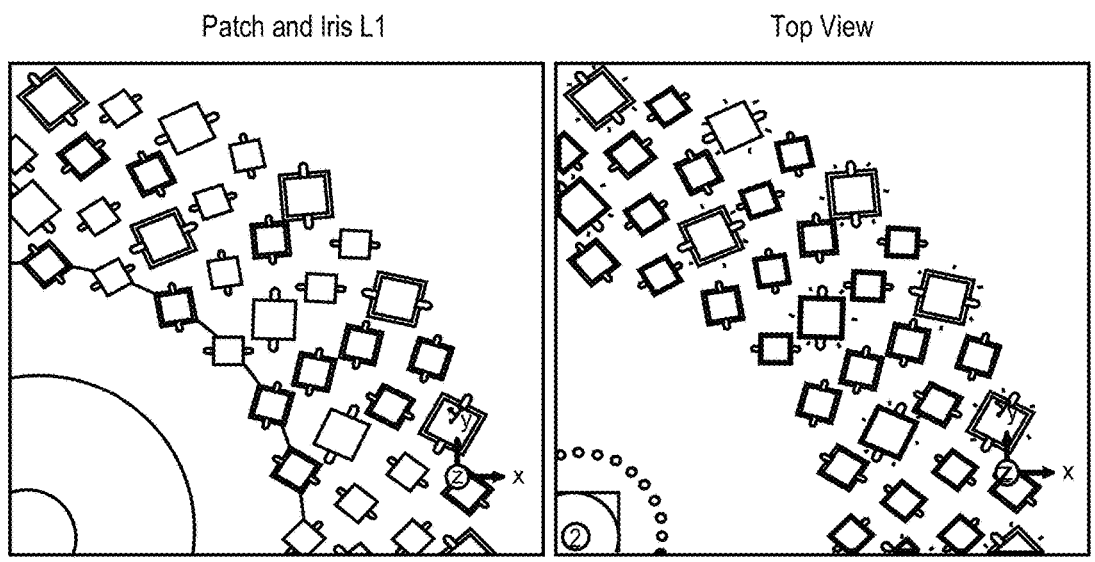

FIG. 14A illustrates a portion of the first iris board layer with locations corresponding to the slots. Referring to FIG. 14A, the circles are open areas/slots in the metallization in the bottom side of the iris substrate, and are for controlling the coupling of elements to the feed (the feed wave). Note that this layer is an optional layer and is not used in all designs. FIG. 14B illustrates a portion of the second iris board layer containing slots. FIG. 14C illustrates patches over a portion of the second iris board layer. FIG. 14D illustrates a top view of a portion of the slotted array.

Figure 15:
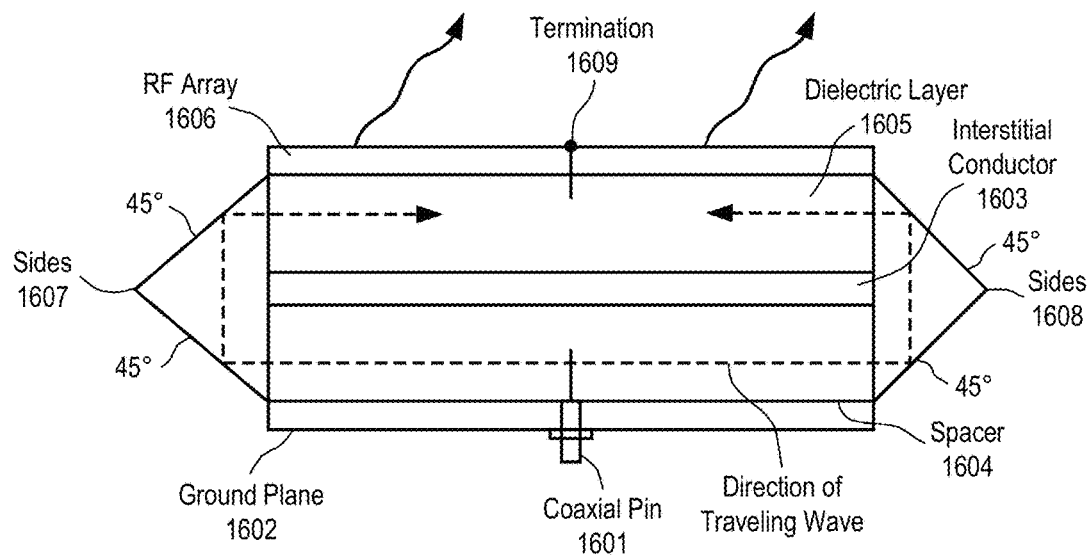
FIG. 15 illustrates a side view of one embodiment of a cylindrically fed antenna structure.

FIG. 15 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 15 includes the coaxial feed of FIG. 9.

Referring to FIG. 15, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be $\lambda/2$, where $\lambda$ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{\mathit{eff}}/2$, where $\lambda_{\mathit{eff}}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 15 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 16:
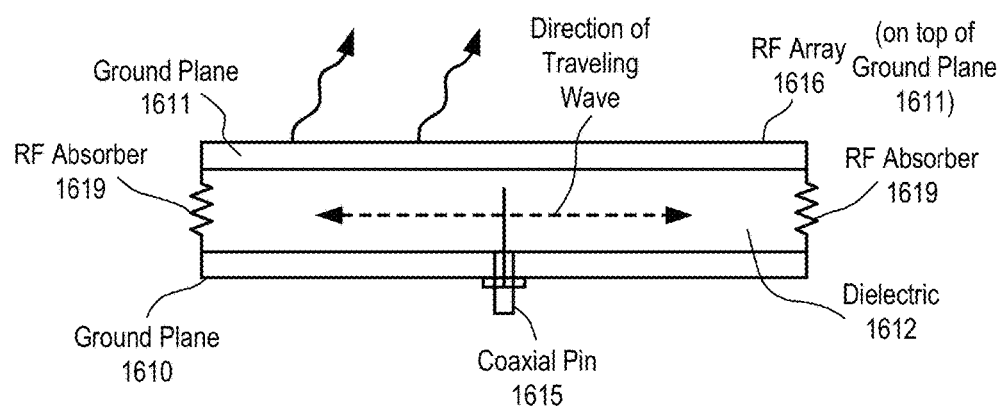
FIG. 16 illustrates another embodiment of the antenna system with an outgoing wave.

FIG. 16 illustrates another embodiment of the antenna system with an outgoing wave. Referring to FIG. 16, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 15 and 16 improves the service angle of the antenna. Instead of a service angle of plus or minus forty five degrees azimuth (±45° Az) and plus or minus twenty five degrees elevation (±25° El), in one embodiment, the antenna system has a service angle of seventy five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 15 and RF array 1616 of FIG. 16 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty five degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 17:
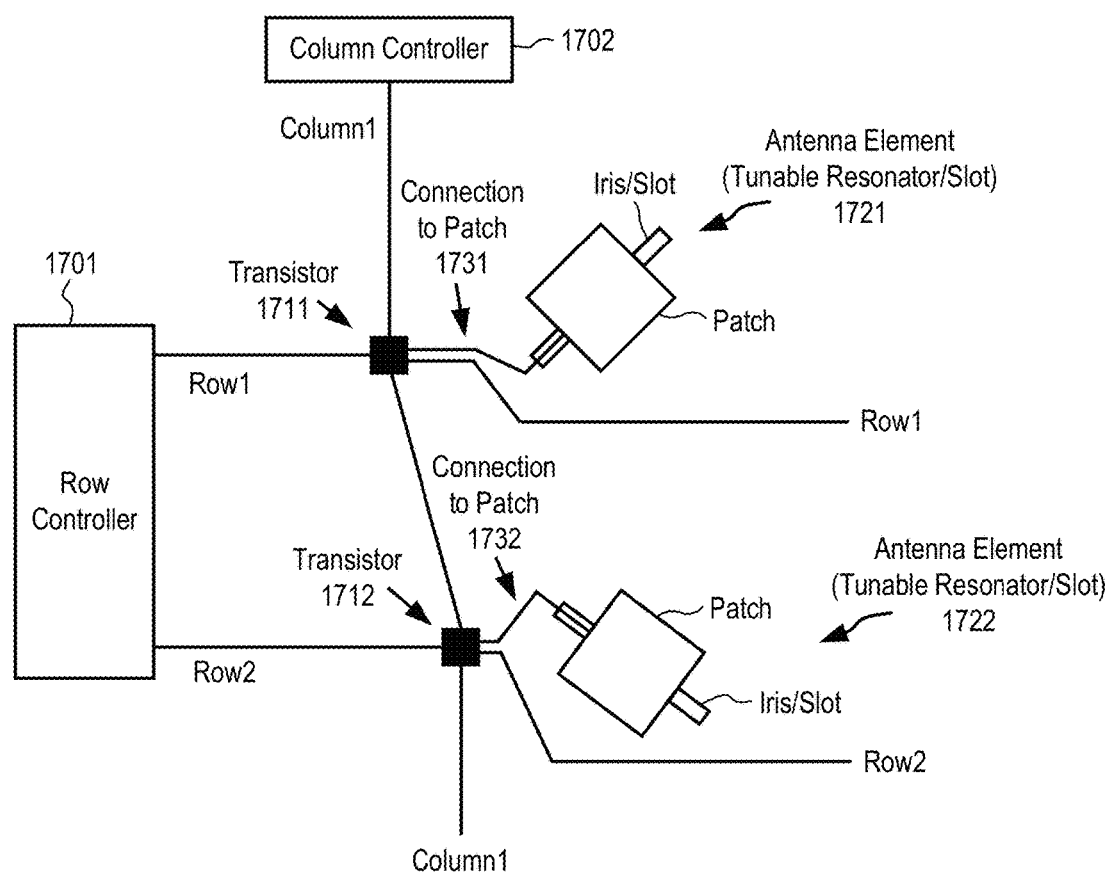
FIG. 17 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 17 illustrates one embodiment of the placement of matrix drive circuitry with respect to antenna elements. Referring to FIG. 17, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is pre-defined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 18:
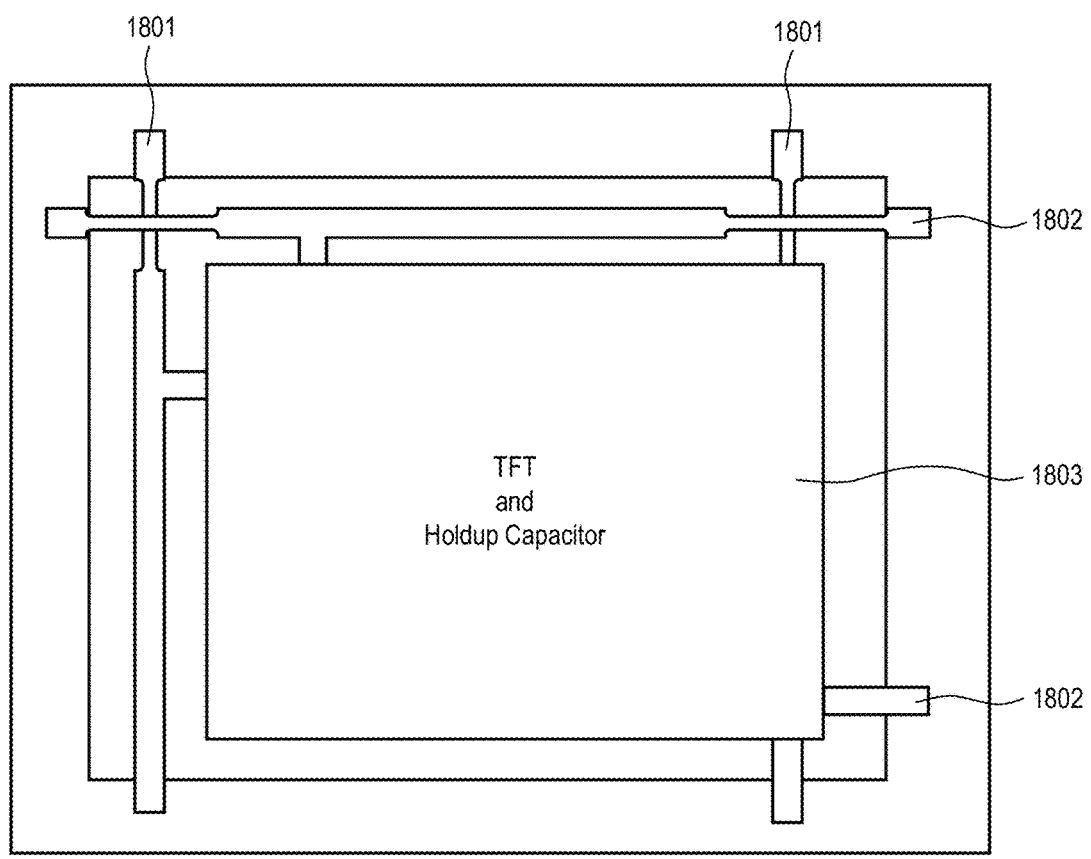
FIG. 18 illustrates one embodiment of a TFT package.

In one embodiment, a TFT package is used to enable placement and unique addressing in the matrix drive. FIG. 18 illustrates one embodiment of a TFT package. Referring to FIG. 18, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example System Embodiment

In one embodiment, the combined antenna apertures are used in a television system that operates in conjunction with a set top box. For example, in the case of a dual reception antenna, satellite signals received by the antenna are provided to a set top box (e.g., a DirecTV receiver) of a television system. More specifically, the combined antenna operation is able to simultaneously receive RF signals at two different frequencies and/or polarizations. That is, one sub-array of elements is controlled to receive RF signals at one frequency and/or polarization, while another sub-array is controlled to receive signals at another, different frequency and/or polarization. These differences in frequency or polarization represent different channels being received by the television system. Similarly, the two antenna arrays can be controlled for two different beam positions to receive channels from two different locations (e.g., two different satellites) to simultaneously receive multiple channels.

Figure 19:
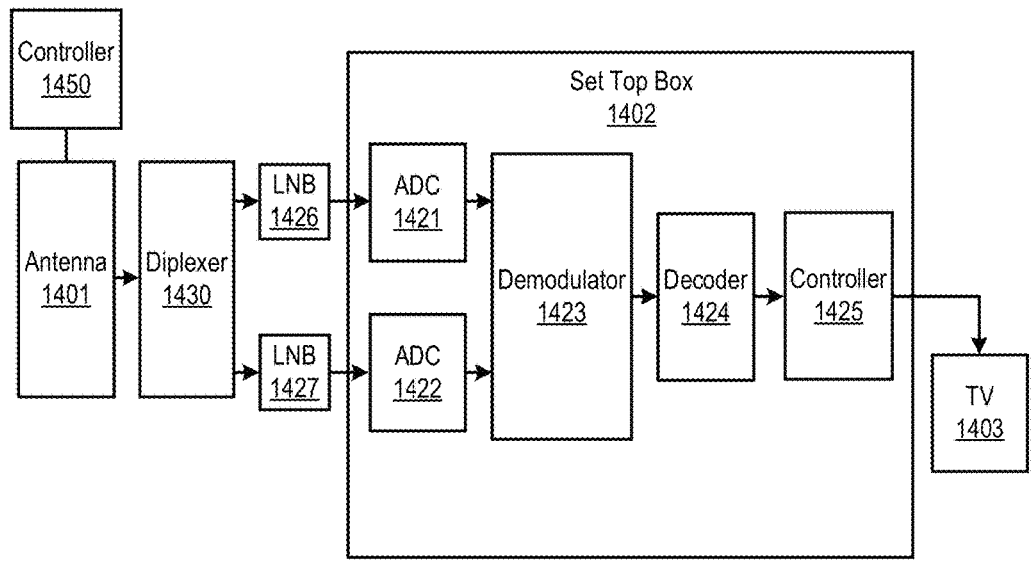
FIG. 19 is a block diagram of one embodiment of a communication system that performs dual reception simultaneously in a television system.

FIG. 19 is a block diagram of one embodiment of a communication system that performs dual reception simultaneously in a television system. Referring to FIG. 19, antenna 1401 includes two spatially interleaved antenna apertures operable independently to perform dual reception simultaneously at different frequencies and/or polarizations as described above. Note that while only two spatially interleaved antenna operations are mentioned, the TV system may have more than two antenna apertures (e.g., 3, 4, 5, etc. antenna apertures).

In one embodiment, antenna 1401, including its two interleaved slotted arrays, is coupled to diplexer 1430. The coupling may include one or more feeding networks that receive the signals from elements of the two slotted arrays to produce two signals that are fed into diplexer 1430. In one embodiment, diplexer 1430 is a commercially available diplexer (e.g., model PB1081WA Ku-band sitcom diplexor from A1 Microwave).

Diplexer 1430 is coupled to a pair of low noise block down converters (LNBs) 1426 and 1427, which perform a noise filtering function, a down conversion function, and amplification in a manner well-known in the art. In one embodiment, LNBs 1426 and 1427 are in an out-door unit (ODU). In another embodiment, LNBs 1426 and 1427 are integrated into the antenna apparatus. LNBs 1426 and 1427 are coupled to a set top box 1402, which is coupled to television 1403.

Set top box 1402 includes a pair of analog-to-digital converters (ADCs) 1421 and 1422, which are coupled to LNBs 1426 and 1427, to convert the two signals output from diplexer 1430 into digital format.

Once converted to digital format, the signals are demodulated by demodulator 1423 and decoded by decoder 1424 to obtain the encoded data on the received waves. The decoded data is then sent to controller 1425, which sends it to television 1403.

Controller 1450 controls antenna 1401, including the interleaved slotted array elements of both antenna apertures on the single combined physical aperture.

An Example of a Full Duplex Communication System

Figure 20:
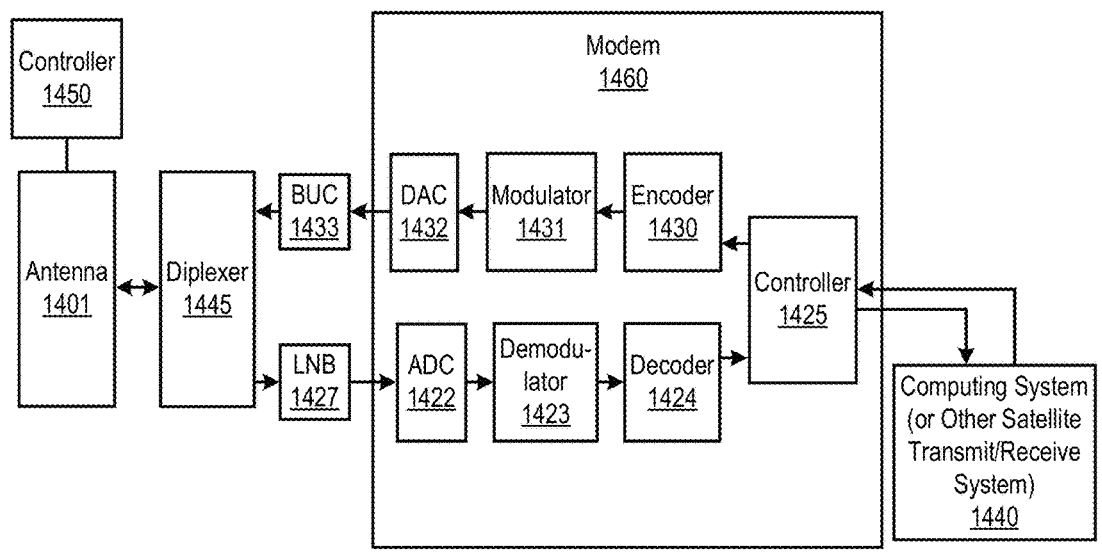
FIG. 20 is a block diagram of another embodiment of a communication system having simultaneous transmit and receive paths.

In another embodiment, the combined antenna apertures are used in a full duplex communication system. FIG. 20 is a block diagram of another embodiment of a communication system having simultaneous transmit and receive paths. While only one transmit path and one receive path are shown, the communication system may include more than one transmit path and/or more than one receive path.

Referring to FIG. 20, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (upconvert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

Note that the full duplex communication system shown in FIG. 20 has a number of applications, including but not limited to, internet communication, vehicle communication (including software updating), etc.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An antenna comprising:
  an antenna element array having a plurality of antenna elements and each antenna element having a liquid crystal (LC) structure, wherein the LC structure comprises a mixture of one or more of the following:

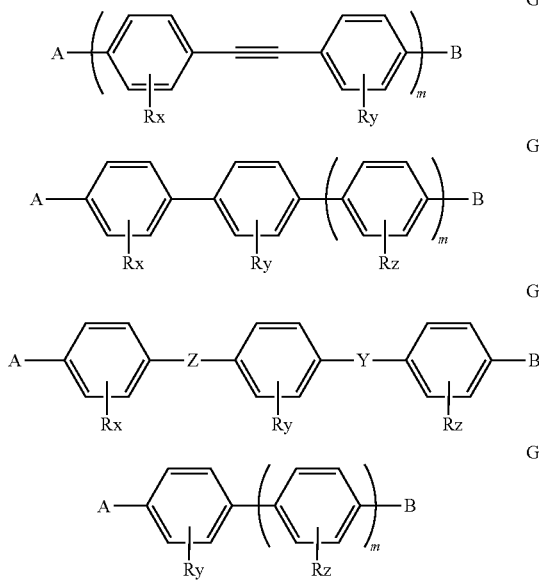

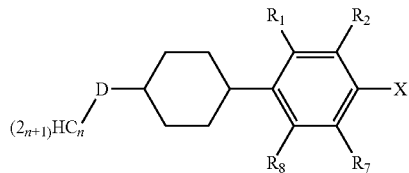
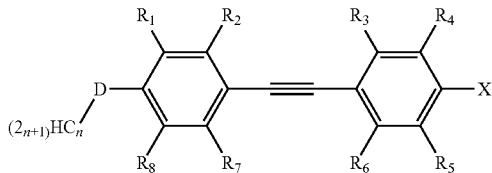

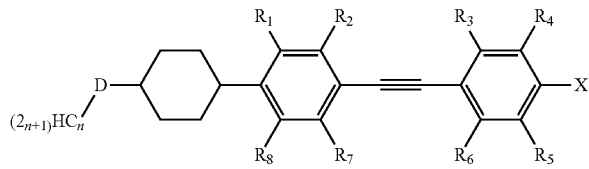
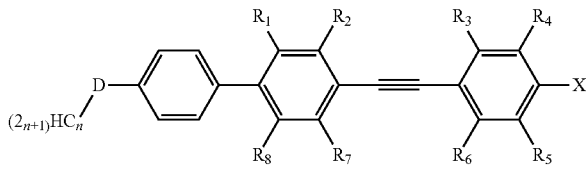

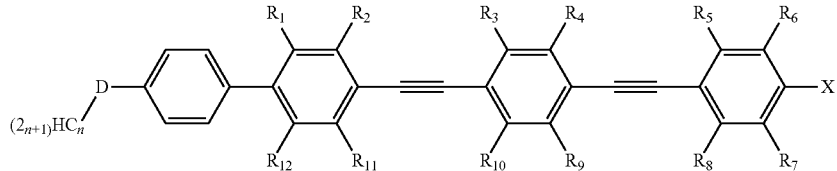

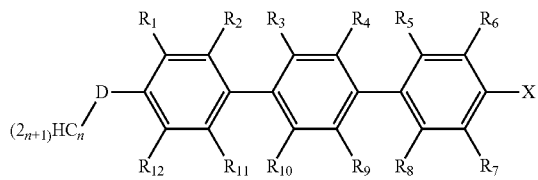

laterally functionalized with one or more of at least a proton, a hydrogen (H), or a heteroatom.

2. The antenna defined in claim 1 wherein the heteroatom comprises at least one selected from a group consisting of: fluorine (F), bromine (Br), or chlorine (Cl).

3. The antenna defined in claim 1 wherein Rx, Ry and Rz comprise one or more alkyl groups.

4. The antenna defined in claim 3 wherein the one or more alkyl groups comprises one or more selected from a group consisting of methyl (CH3) ethyl (CH2CH3), propyl (CH2CH2CH3), or methoxy (OCH3), ethoxy (OCH2CH3), propoxy (OCH2CH3), or trifluoromethoxy (OCF3).

5. The antenna defined in claim 1 wherein A is either a saturated carbon chain, an alkoxy ($OC_nH_{(2n+1)}$), cyclohexyl or phenyl moiety.

6. The antenna defined in claim 1 wherein B is either a second alkyl, an alkoxy chain or a polar group.

7. The antenna defined in claim 6 wherein the polar group comprises a heteroatom, a Cyano (CN), or an isothiocyanate (NCS), trifluoromethoxy ($OCF_3$), cyano (CN), bromide (Br), or trifluorophenyl ($C_6H_2F_3$).

8. The antenna defined in claim 1 wherein the mixture comprises one or more of the following:

wherein D equals $CH_2$, O, S, or Se; R1-R12 equals $C_nH_{(2n+1)}$, H, F, Cl, $SC_nH_{(2n+1)}$, $SeC_nH_{(2n+1)}$, or Br; and X equals NCS, F, Br, Cl, or H, and n is an integer.

9. The antenna defined in claim 8 wherein n equals 1 to 7.

10. The antenna defined in claim 8 wherein D is a carbon and two hydrogens, X equals NCS, and n equals 4 in structure 1.

11. The antenna defined in claim 8 wherein D is an oxygen and two hydrogens, X equals NCS, and n equals 4 in structure 1.

12. The antenna defined in claim 8 wherein D equals and X equals NCS in structure 2.

13. The antenna defined in claim 8 wherein D equals and X equals NCS in structure 3.

14. The antenna defined in claim 8 wherein D equals and X equals NCS in structure 4.

15. The antenna defined in claim 8 wherein D equals and X equals NCS in structure 5.

16. The antenna defined in claim 8 wherein D equals and X equals NCS in structure 6.

17. The antenna defined in claim 1 further comprising:
an antenna feed to input a feed wave that propagates concentrically from the feed;
a plurality of slots;
a plurality of patches, wherein each of the patches is co-located over and separated from a slot in the plurality of slots using the LC cells and forming a patch/slot pair, each patch/slot pair being turned off or on based on application of a voltage to the patch in the pair specified by a control pattern.

18. The antenna defined in claim 1 wherein the antenna elements are controlled and operable together to form a beam for the frequency band for use in holographic beam steering.

19. The antenna defined in claim 1 wherein the antenna elements are part of a tunable slotted array comprising a plurality of slots and further wherein each slot is tuned to provide a desired scattering at a given frequency, and wherein elements in the tunable slotted array are positioned in one or more rings.

20. An antenna comprising:
an antenna element array having a plurality of antenna elements and each antenna element having a liquid crystal (LC) structure, wherein the LC structure comprises a mixture of two or more of the following compounds:

111.7h
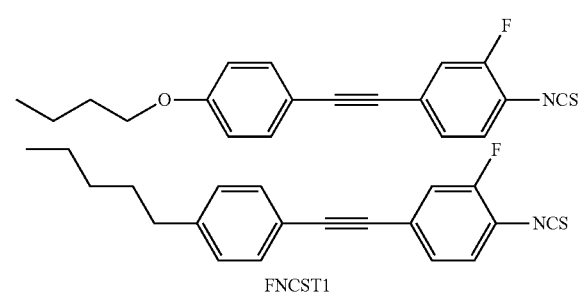
FNCST1

11.7h
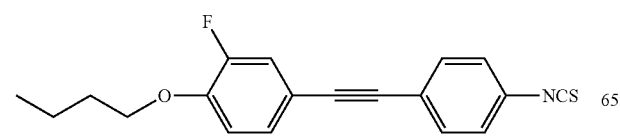

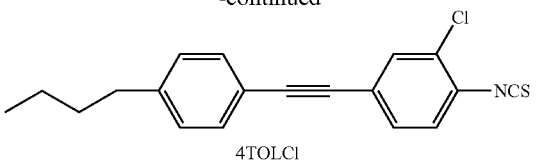
4TOLCl 11.7i
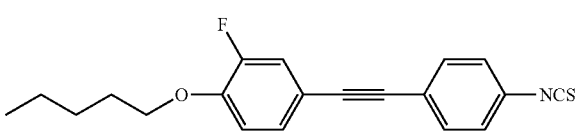

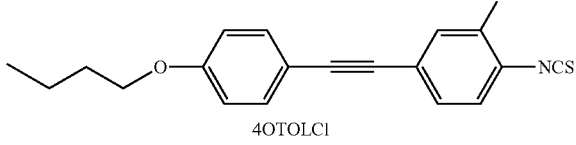
4OTOLCl 111.7f
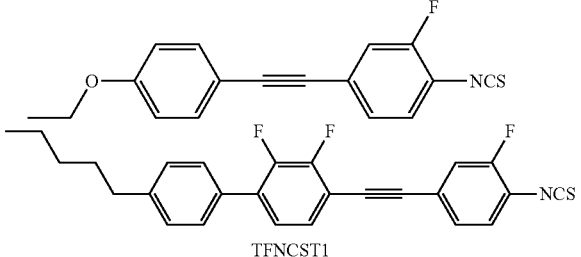
TFNCST1

111.7n
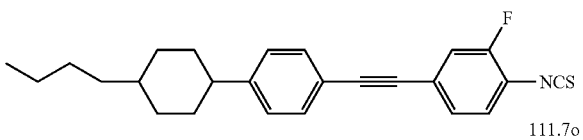

111.7o
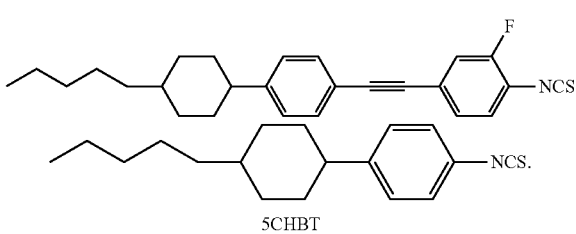
5CHBT

21. The antenna defined in claim 20 wherein the mixture includes at least 7 of the compounds.

22. The antenna defined in claim 20 wherein the mixture includes at least 8 of the compounds.

23. The antenna defined in claim 20 wherein the mixture includes at least 9 of the compounds.

24. The antenna defined in claim 20 wherein the mixture includes at least 11.7h, 11.7i, and 111.7h.

25. The antenna defined in claim 24 wherein the mixture also includes at least 111.7n and 111.7o.

26. The antenna defined in claim 24 wherein the mixture also includes at least 4TOLCl or FNCST1.

27. The antenna defined in claim 20 further comprising:
an antenna feed to input a feed wave that propagates concentrically from the feed;
a plurality of slots;
a plurality of patches, wherein each of the patches is co-located over and separated from a slot in the plurality of slots using the LC cells and forming a patch/ slot pair, each patch/slot pair being turned off or on based on application of a voltage to the patch in the pair specified by a control pattern.

28. The antenna defined in claim 20 wherein the antenna elements are controlled and operable together to form a beam for the frequency band for use in holographic beam steering.

29. The antenna defined in claim 20 wherein the antenna elements are part of a tunable slotted array comprising a plurality of slots and further wherein each slot is tuned to provide a desired scattering at a given frequency, and wherein elements in the tunable slotted array are positioned in one or more rings.

* * * * *